(12) United States Patent
Iida

(10) Patent No.: US 8,237,398 B2
(45) Date of Patent: Aug. 7, 2012

(54) ELECTRIC SYSTEM, CHARGING DEVICE AND CHARGING METHOD FOR ELECTRIC SYSTEM FOR DISCHARGING OF A POWER STORAGE MECHANISM FOR RESETTING A STATE OF A CHARGE

(75) Inventor: Takahide Iida, Ichinomiya (JP)

(73) Assignees: Toyota Jidosha Kabushiki Kaisha, Toyota (JP); Kabushiki Kaisha Toyota Jidoshokki, Kariya (JP)

(*) Notice: Subject to any disclaimer, the term of this patent is extended or adjusted under 35 U.S.C. 154(b) by 228 days.

(21) Appl. No.: 12/451,976

(22) PCT Filed: Jun. 6, 2008

(86) PCT No.: PCT/JP2008/060817
§ 371 (c)(1),
(2), (4) Date: Jan. 12, 2010

(87) PCT Pub. No.: WO2008/153115
PCT Pub. Date: Dec. 18, 2008

(65) Prior Publication Data
US 2010/0134065 A1    Jun. 3, 2010

(30) Foreign Application Priority Data
Jun. 11, 2007   (JP) .................................. 2007-154325

(51) Int. Cl.
*H02J 7/00*   (2006.01)
(52) U.S. Cl. ........................................ 320/103; 320/134
(58) Field of Classification Search .................. 320/103
See application file for complete search history.

(56) References Cited

U.S. PATENT DOCUMENTS

| | | | | |
|---|---|---|---|---|
| 5,982,146 A | * | 11/1999 | Nguyen | 320/131 |
| 6,081,096 A | * | 6/2000 | Barkat et al. | 320/124 |
| 6,741,065 B1 | * | 5/2004 | Ishii et al. | 320/122 |
| 7,038,426 B2 | * | 5/2006 | Hall | 320/135 |
| 2008/0197801 A1 | * | 8/2008 | Manor et al. | 320/103 |

FOREIGN PATENT DOCUMENTS

| | | |
|---|---|---|
| JP | A-11-146505 | 5/1999 |
| JP | A-2000-277168 | 10/2000 |
| JP | A-2002-025631 | 1/2002 |
| JP | A-2002-152984 | 5/2002 |
| JP | A-2002-233068 | 8/2002 |
| JP | A-2003-217678 | 7/2003 |
| JP | A-2004-361313 | 12/2004 |
| JP | A-2006-191729 | 7/2006 |

OTHER PUBLICATIONS

International Search Report issued in International Application No. PCT/JP2008/060817 on Sep. 16, 2008 (w/ translation).

* cited by examiner

*Primary Examiner* — Arun Williams
(74) *Attorney, Agent, or Firm* — Oliff & Berridge, PLC

(57) ABSTRACT

An ECU executes a program including the steps of causing a battery pack to discharge when an external power supply is connected to a charger, stopping discharge of the battery pack when a state of charge of the battery pack is reduced to a reset value, and charging the battery pack after the state of charge is reduced to the reset value.

13 Claims, 14 Drawing Sheets

F I G. 1 5
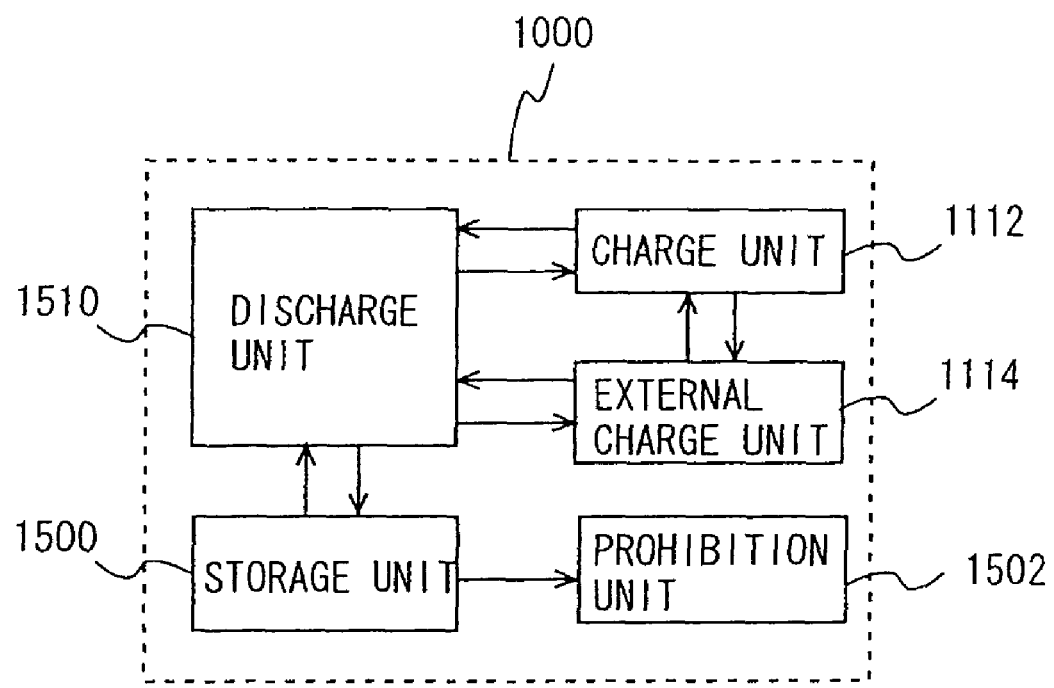

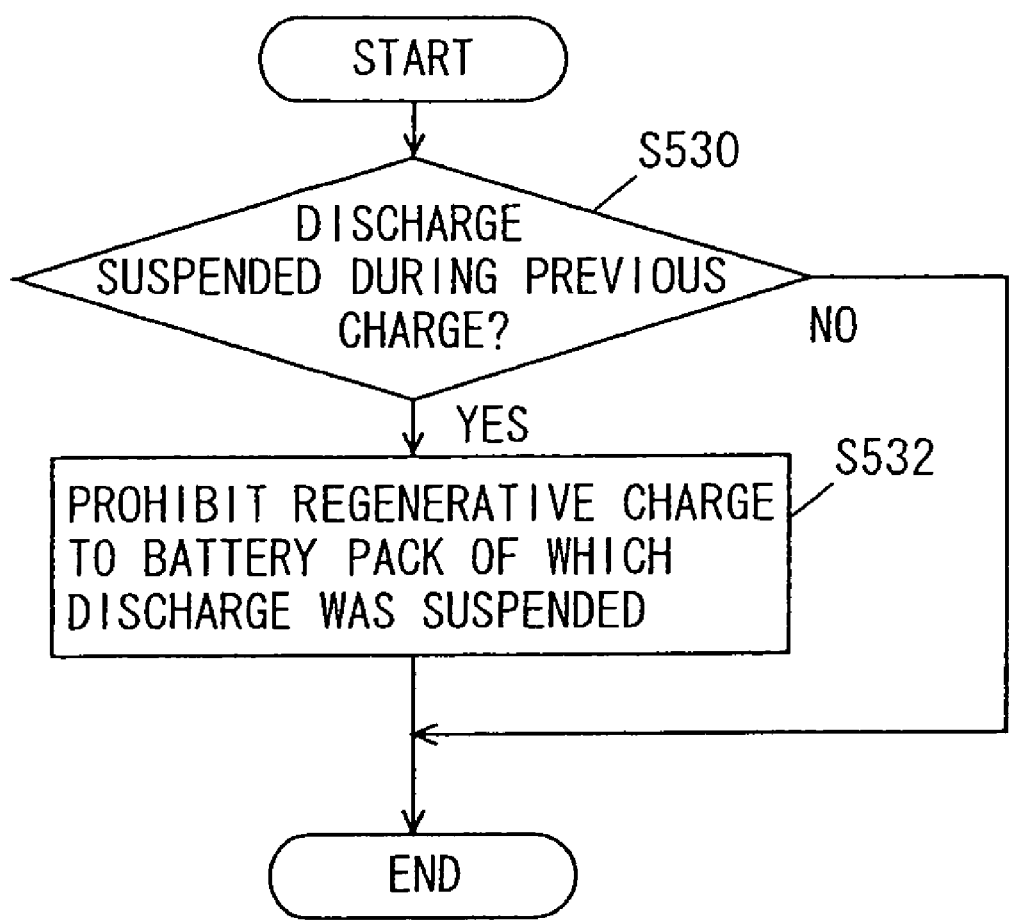

ELECTRIC SYSTEM, CHARGING DEVICE AND CHARGING METHOD FOR ELECTRIC SYSTEM FOR DISCHARGING OF A POWER STORAGE MECHANISM FOR RESETTING A STATE OF A CHARGE

TECHNICAL FIELD

The present invention relates to an electric system, a charging device and a charging method for the electric system, and particularly to a technique for discharge of a power storage mechanism for resetting a state of charge thereof.

BACKGROUND ART

Conventionally, hybrid vehicles, electric vehicles and the like have been known that run by driving force from an electric motor. These vehicles have a battery mounted thereon for storing electric power to be supplied to the electric motor serving as a driving source. The battery is discharged or charged, for example, in consideration of a state of charge of the battery. The state of charge of the battery is calculated based on a value of a current discharged from the battery, a value of a current charged into the battery, a voltage of the battery, and the like. That is, the state of charge is calculated with an estimated value, which may result in a difference between the calculated state of charge and the actual state of charge. In order to increase accuracy of a state of charge, therefore, techniques of initializing a state of charge of a battery have been proposed.

Japanese Patent Laying-Open No. 2002-25631 discloses a battery pack including a secondary battery, a detection unit for detecting a charge/discharge current and/or a charge/discharge voltage of this secondary battery, a state-of-charge calculation unit for calculating a state of charge of the secondary battery based on the detected charge/discharge current value and charge/discharge voltage value, and a display unit for displaying a value of the calculated state of charge. This battery pack further includes a state-of-charge display button for causing, when pressed, a display unit to display the state of charge of the secondary battery. When the state-of-charge display button is pressed to satisfy a prescribed condition, the state-of-charge calculation unit is initialized.

According to the battery pack described in this publication, a switch mechanism for achieving the function of displaying the state of charge of the secondary battery by displaying the state of charge and the function of initializing the state-of-charge calculation unit can be integrated into a single button, thus eliminating the need for separately providing buttons each including a switch mechanism for achieving each function. Accordingly, the number of components can be reduced, thereby minimizing costs. Further, the sharing of the button also reduces a required footprint by half as compared to an example where buttons are separately provided on a case. As a result, a degree of freedom in designing a shape of the battery back is significantly increased.

In the battery pack described in Japanese Patent Laying-Open No. 2002-25631, however, the state of charge cannot be reset unless a user presses the button. Therefore, the state of charge may remain unreset for a long time, which may deteriorate accuracy of the state of charge in a system where a power storage mechanism may repeatedly be discharged and charged frequently, for example.

DISCLOSURE OF THE INVENTION

An object of the present invention is to provide an electric system, a charging device and a charging method for the electric system capable of improving accuracy of a state of charge.

An electric system according to an aspect of the present invention includes a power storage mechanism for storing electric power, and a control unit. The control unit detects connection of the power storage mechanism to an external power supply, automatically causes the power storage mechanism to discharge until a state of charge of the power storage mechanism decreases to a predetermined value upon detecting connection of the power storage mechanism to the external power supply, and causes the power storage mechanism to be charged after discharge of the power storage mechanism until the state of charge of the power storage mechanism decreases to the predetermined value.

According to this structure, when connection of the power storage mechanism to the external power supply is detected, the power storage mechanism is automatically discharged until a state of charge of the power storage mechanism decreases to a predetermined value. After the power storage mechanism is discharged until the state of charge of the power storage mechanism decreases to the predetermined value, the power storage mechanism is charged. Thus, the power storage mechanism can be charged after the state of charge of the power storage mechanism is automatically reset, thereby improving accuracy of the state of charge.

Preferably, the power storage mechanism includes a first power storage mechanism and a second power storage mechanism connected in parallel to each other. The control unit causes the first power storage mechanism and the second power storage mechanism to discharge in an alternating manner, so that electric power discharged from one of the power storage mechanisms is charged into the other power storage mechanism.

According to this structure, electric power discharged from one of the power storage mechanisms is charged into the other power storage mechanism. Thus, electric power loss in resetting the state of charge of the power storage mechanism can be minimized.

Still preferably, the control unit causes, during discharge of one of the power storage mechanisms, the other power storage mechanism to be charged with electric power supplied from outside the electric system.

According to this structure, during discharge of one power storage mechanism, electric power supplied from outside the electric system is charged into the other power storage mechanism. Thus, the power storage mechanism can be quickly charged.

Still preferably, the power storage mechanism includes a first power storage mechanism and a second power storage mechanism connected in parallel to each other. The control unit causes the first power storage mechanism and the second power storage mechanism to discharge in an alternating manner, so that, during discharge of one of the power storage mechanisms, electric power supplied from outside the electric system is charged into the other power storage mechanism.

According to this structure, during discharge of one power storage mechanism, electric power supplied from outside the electric system is charged into the other power storage mechanism. Thus, the power storage mechanism can be quickly charged.

Still preferably, the control unit causes the power storage mechanism to discharge such that a rate of reduction in the state of charge of the power storage mechanism varies depending on at least any one of the state of charge and a voltage of the power storage mechanism during discharge of the power storage mechanism.

According to this structure, the power storage mechanism is discharged such that a rate of reduction in the state of charge of the power storage mechanism varies depending on at least any one of the state of charge and a voltage of the power storage mechanism during discharge of the power storage mechanism. Thus, the power storage mechanism can be discharged with a great rate of reduction when the state of charge or the voltage is high as compared to an example where they are low, and with a small rate of reduction when the state of charge or the voltage is low as compared to an example where they are high. Therefore, the state of charge can be quickly reduced immediately after discharge is started, and the state of charge can be gradually reduced when the state of charge is in the vicinity of the predetermined value. As a result, discharge can be quickly conducted, and accuracy of the state of charge can be improved.

Still preferably, the control unit causes the power storage mechanism to discharge such that a voltage thereof is constant.

According to this structure, the power storage mechanism is discharged such that a voltage thereof is constant. Thus, a current discharged from the power storage mechanism can be varied depending more on the state of charge than on the voltage. As a result, by monitoring the current discharged from the power storage mechanism, the state of charge of the power storage mechanism can be accurately reduced to the predetermined value.

Still preferably, the control unit determines whether to permit or prohibit discharge of the power storage mechanism in accordance with the state of charge of the power storage mechanism.

According to this structure, whether to permit or prohibit discharge of the power storage mechanism is determined in accordance with the state of charge of the power storage mechanism. Thus, discharge can be permitted if the state of charge of the power storage mechanism is lower than a threshold value, and can be prohibited if the state of charge is higher than the threshold value. As a result, loss of the electric power discharged from the power storage mechanism in order to reset its state of charge can be decreased.

Still preferably, the power storage mechanism is mounted on a vehicle for supplying electric power to a driving source. The control unit stores information about discharge of the power storage mechanism until the state of charge of the power storage mechanism decreases to the predetermined value, and controls the power storage mechanism during travel of the vehicle based on the information.

According to this structure, the power storage mechanism is mounted on a vehicle for supplying electric power to a driving source. The power storage mechanism is controlled during travel of the vehicle based on information about discharge of the power storage mechanism until the state of charge of the power storage mechanism decreases to the predetermined value. For example, the power storage mechanism is controlled to reduce its state of charge during travel of the vehicle based on information indicating that discharge was prohibited since the state of charge of the power storage mechanism was higher than the threshold value. Accordingly, a condition for resetting the state of charge can be satisfied.

Still preferably, the control unit stores information about discharge of the power storage mechanism until the state of charge of the power storage mechanism decreases to the predetermined value during a first period, and causes the power storage mechanism to discharge based on the information when charging the power storage mechanism during a second period later than the first period.

According to this structure, when charging the power storage mechanism during a second period later than the first period, the power storage mechanism is discharged based on information about discharge of the power storage mechanism until the state of charge of the power storage mechanism decreases to the predetermined value during the first period. For example, based on information indicating that discharge was suspended before the state of charge of the power storage mechanism decreases to the predetermined value during the first period, discharge is resumed with the state of charge at the time of suspension. Thus, discharge can be quickly completed.

Still preferably, the power storage mechanism is a battery.

According to this structure, accuracy of the state of charge of the battery can be improved.

BRIEF DESCRIPTION OF THE DRAWINGS

FIG. 15 is a functional block diagram of an ECU in a charging device according to a fifth embodiment of the present invention.

FIG. 18 is a flowchart (No. 3) showing a control structure of a program executed by the ECU in the charging device according to the fifth embodiment of the present invention.

BEST MODES FOR CARRYING OUT THE INVENTION

Embodiments of the present invention will be described below with reference to the drawings. In the following description, the same components are designated with the same characters, and their names and functions are also the same. Accordingly, detailed description thereof will not be repeated.

First Embodiment

Figure 1:
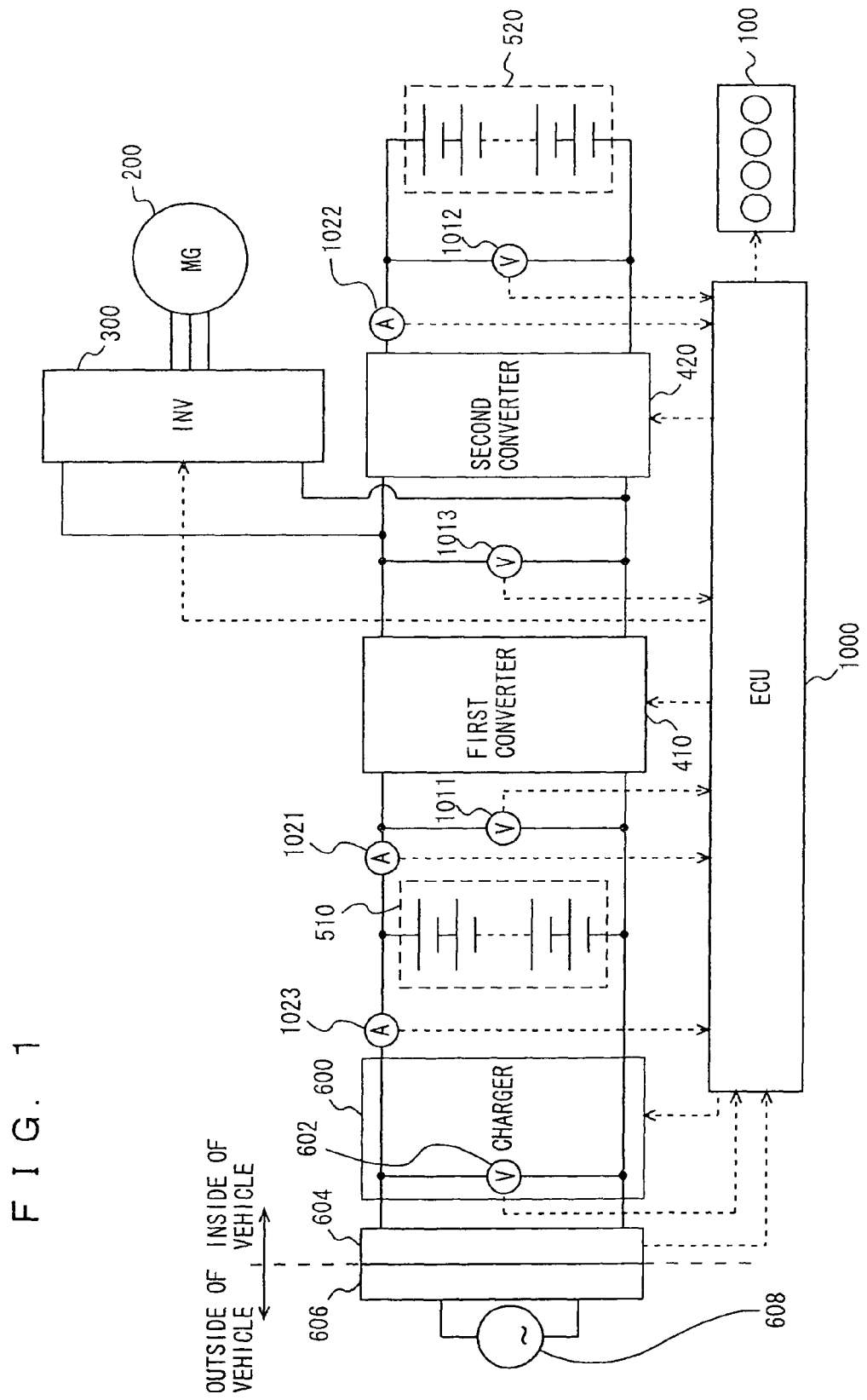
FIG. 1 is a schematic configuration diagram showing a hybrid vehicle.

Referring to FIG. 1, a hybrid vehicle having a charging device for an electric system according to a first embodiment of the present embodiment will be described. This hybrid vehicle has an engine 100, an MG (Motor Generator) 200, an inverter 300, a first converter 410, a second converter 420, a first battery pack 510, a second battery pack 520, a charger 600, and an ECU (Electronic Control Unit) 1000 mounted thereon. It is noted that ECU 1000 may be divided into a plurality of ECUs.

The electric system includes MG 200, inverter 300, first converter 410, second converter 420, first battery pack 510, second battery pack 520, and charger 600. The hybrid vehicle runs by driving force from at least any one of engine 100 and MG 200.

MG 200 is a three-phase AC motor. MG 200 is driven by electric power stored in first battery pack 510 and second battery pack 520. MG 200 is supplied with electric power having been converted from DC to AC by inverter 300.

The driving force from MG 200 is transmitted to wheels, so that MG 200 assists engine 100, runs the vehicle by its driving force, and the like. During regenerative braking of the hybrid vehicle, on the other hand, MG 200 is driven by the wheels, to operate as a generator. MG 200 thus operates as a regenerative brake converting braking energy to electric power. The electric power generated by MG 200 is converted from AC to DC by inverter 300, and then stored in first battery pack 510 and second battery pack 520.

First battery pack 510 and second battery pack 520 are assembled batteries formed by integrating a plurality of battery cells into a battery module, and further connecting a plurality of the battery modules in series. A discharge voltage from first battery pack 510 and a charge voltage into first battery pack 510 are adjusted by first converter 410. A discharge voltage from second battery pack 520 and a charge voltage into second battery pack 520 are adjusted by second converter 420.

First converter 410 and second converter 420 are connected in parallel. First converter 410 is connected to first battery pack 510. Second converter 420 is connected to second battery pack 520. Thus, first battery pack 510 and second battery pack 520 are connected in parallel via first converter 410 and second converter 420. Inverter 300 is connected between first converter 410 and second converter 420.

A positive electrode terminal and a negative electrode terminal of first battery pack 510 are connected to charger 600. Thus, first battery pack 510 and second battery pack 520 are connected in parallel with respect to charger 600. It is noted that capacitors (condensers) may be used instead of the batteries.

When charging first battery pack 510 and second battery pack 520, charger 600 supplies electric power to first battery pack 510 and second battery pack 520 from outside the hybrid vehicle. It is noted that charger 600 may be installed outside the hybrid vehicle.

A voltage sensor 602 is provided in charger 600. A signal indicating a voltage value detected by voltage sensor 602 is transmitted to ECU 1000. Charger 600 is connected to an external power supply 608 via a charge connector 604 and a charge plug 606. First battery pack 510 and second battery pack 520 are connected to external power supply 608 via charger 600.

Engine 100, inverter 300, first converter 410, second converter 420, and charger 600 are controlled by ECU 1000. ECU 1000 receives signals from voltage sensors 1011 to 1013 and current sensors 1021 to 1023.

Voltage sensor 1011 detects a voltage value of first battery pack 510. Voltage sensor 1012 detects a voltage value of second battery pack 520. Voltage sensor 1013 detects a system voltage value (a voltage value of a section between first converter 410 and second converter 420).

Current sensor 1021 detects a value of a current discharged from first battery pack 510 or a value of a current charged into first battery pack 510. Current sensor 1022 detects a value of a current discharged from second battery pack 520 or a value of a current charged into second battery pack 520. Current sensor 1023 detects a value of a current supplied from charger 600 to first battery pack 510 and second battery pack 520.

ECU 1000 calculates states of charge (SOCs) of first battery pack 510 and second battery pack 520 based on the voltage values, the current values and the like input from these sensors. Well-known common techniques may be used as a method of calculating the state of charge, and thus detailed description thereof will not be repeated here.

Figure 2:
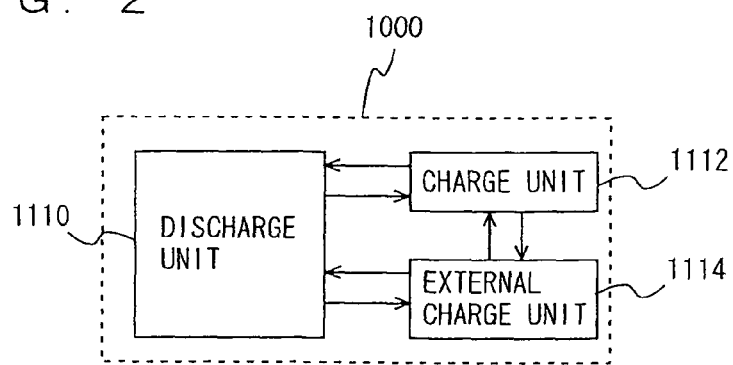
FIG. 2 is a functional block diagram of an ECU in a charging device according to a first embodiment of the present invention.

Referring to FIG. 2, a function of ECU 1000 will be described. It is noted that the function of ECU 1000 which will be described below may be implemented with software, or may be implemented with hardware.

ECU 1000 includes a discharge unit 1110, a charge unit 1112, and an external charge unit 1114.

Figure 3:
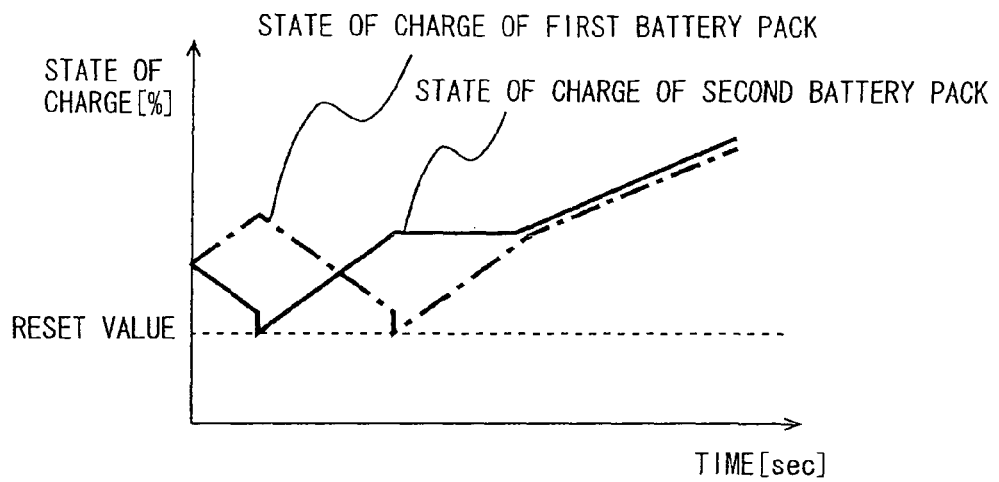
FIG. 3 is a diagram (No. 1) showing a state of charge of a first battery pack and a state of charge of a second battery pack.

When charger 600 is connected to external power supply 608, namely, when charging first battery pack 510 and second battery pack 520, discharge unit 1110 automatically causes first battery pack 510 and second battery pack 520 to discharge until the states of charge of first battery pack 510 and second battery pack 520 are reduced to a reset value, as shown in FIG. 3. After second battery pack 520 is discharged, first battery pack 510 is discharged.

Figure 4:
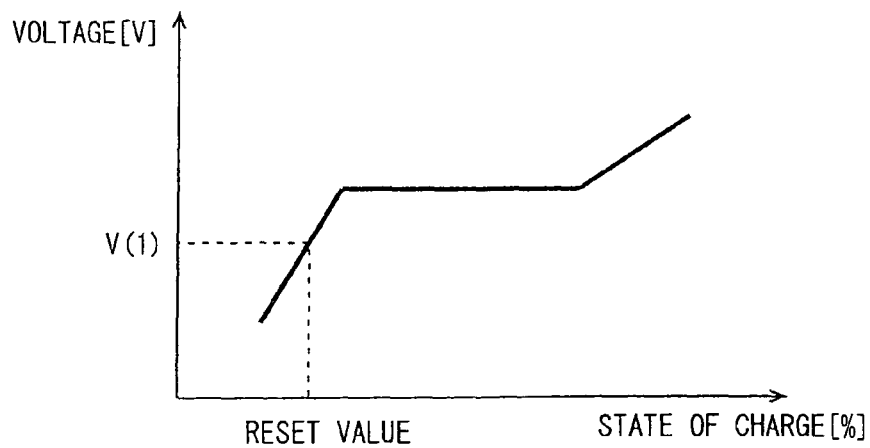
FIG. 4 shows relation between the state of charge and a voltage value.

Discharge unit 1110 causes first battery pack 510 and second battery pack 520 to discharge with a constant current value, for example. When the battery pack is discharged with the constant current value, the voltage of the battery pack is determined correspondingly to its state of charge, as shown in FIG. 4. Accordingly, when the voltage value of the battery pack is reduced to a threshold value determined correspondingly to the reset value, for example, it is determined that the state of charge has been reduced to the reset value. When the state of charge is reduced to the reset value, discharge is stopped.

After the states of charge are reduced to the reset value, ECU 1000 uses the reset value as an initial value in calculating the states of charge of first battery pack 510 and second battery pack 520.

As shown in FIG. 3, charge unit 1112 causes first battery pack 510 to be charged with electric power discharged from second battery pack 520. After second battery pack 520 is discharged until the state of charge of second battery pack 520 is reduced to the reset value, charge unit 1112 also causes second battery pack 520 to be charged with electric power discharged from first battery pack 510.

The electric power discharged from second battery pack 520 is charged into first battery pack 510 by making a voltage on an output side of second converter 420 (a side to which first converter 410 is connected) higher than a voltage on an output side of first converter 410 (a side to which second converter 420 is connected), for example. Conversely, the electric power discharged from first battery pack 510 is charged into second battery pack 520 by making the voltage on the output side of first converter 410 higher than the voltage on the output side of second converter 420. A charging method is not limited as such.

During discharge of second battery pack 520, external charge unit 1114 causes first battery pack 510 to be charged with electric power supplied from outside the hybrid vehicle via charger 600. During discharge of first battery pack 510, external charge unit 1114 also causes second battery pack 520 to be charged with the electric power supplied from outside the hybrid vehicle via charger 600.

Further, after first battery pack 510 is discharged until the state of charge of first battery pack 510 is reduced to the reset value, external charge unit 1114 causes first battery pack 510 and second battery pack 520 to be charged with the electric power supplied from outside the hybrid vehicle via charger 600.

It is noted that first battery pack 510 and second battery pack 520 are eventually charged until their states of charge increase, for example, to a maximum value, i.e., "100%". Alternatively, the battery packs may be charged until their states of charge increase to a value lower than the maximum value.

Figure 5:
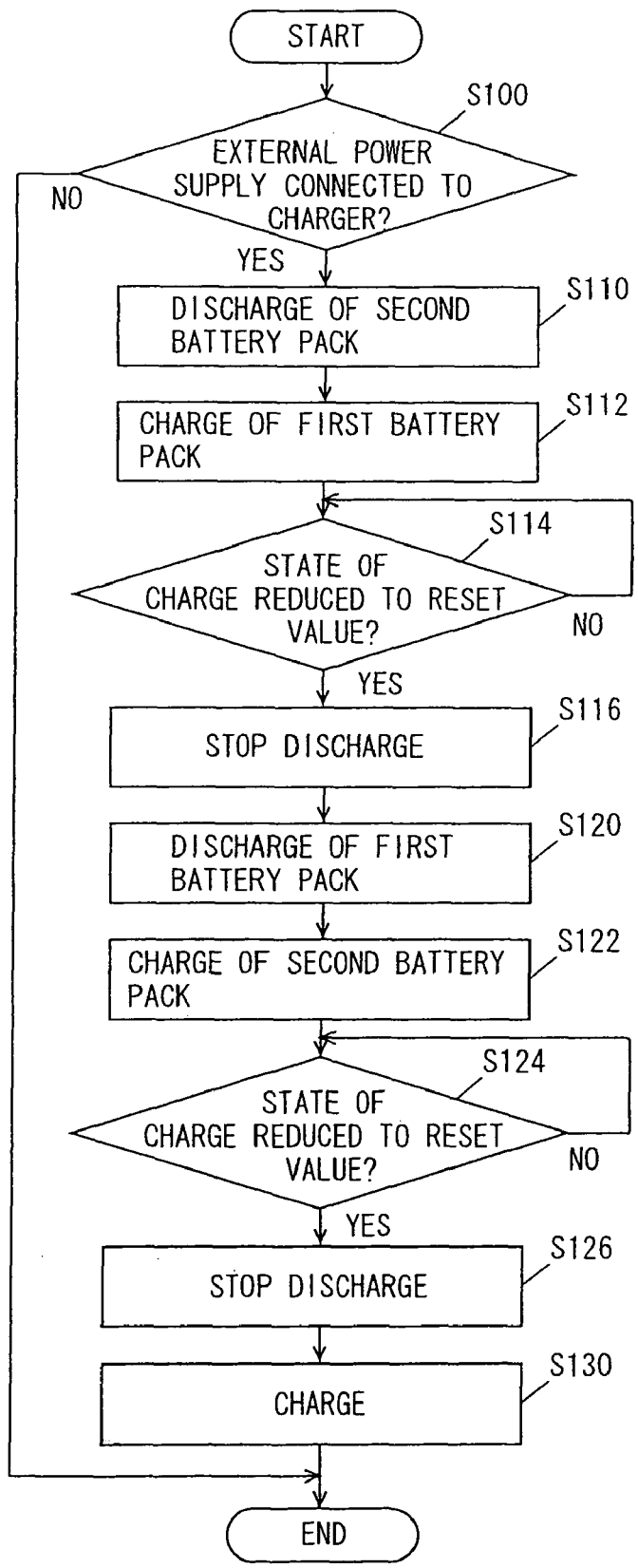
FIG. 5 is a flowchart showing a control structure of a program executed by an ECU in the charging device according to the first embodiment of the present invention.

Referring to FIG. 5, a control structure of a program executed by ECU 1000 will be described. It is noted that the program executed by ECU 1000 may be recorded onto recording media such as CDs (Compact Discs), DVDs (Digital Versatile Discs) and the like, and distributed to the market.

At step (a step will be abbreviated as S hereinafter) 100, ECU 1000 determines whether or not external power supply 608 for the hybrid vehicle has been connected to charger 600. If external power supply 608 for the hybrid vehicle is connected to charger 600 (YES at S100), the process proceeds to S110. If not (NO at S100), this process ends.

It is detected whether or not external power supply 608, such as a commercial power supply of AC 100V or AC 200V, has been connected to charger 600. The connection may be detected based on a voltage detected by voltage sensor 602 provided in charger 600, or may be detected through a switch or the like which is physically turned on by charge plug 606 when charge plug 606 is inserted in a charge outlet provided in an exterior of the vehicle. By combining these two methods, whether or not external power supply 608 has been connected to charger 600 can be detected more reliably.

At S110, ECU 1000 causes second battery pack 520 to discharge. At S112, ECU 1000 causes first battery pack 510 to be charged with the electric power discharged from second battery pack 520 and the electric power supplied from charger 600.

At S114, ECU 1000 determines whether or not the state of charge of second battery pack 520 has been reduced to the reset value. If the state of charge of second battery pack 520 is reduced to the reset value (YES at S114), the process proceeds to S116. If not (NO at S114), the process returns to S114. At S116, ECU 1000 stops discharge of second battery pack 520.

At S120, ECU 1000 causes first battery pack 510 to discharge. At S122, ECU 1000 causes second battery pack 520 to be charged with the electric power discharged from first battery pack 510 and the electric power supplied from charger 600.

At S124 ECU 1000 determines whether or not the state of charge of first battery pack 510 has been reduced to the reset value. If the state of charge of first battery pack 510 is reduced to the reset value (YES at S124), the process proceeds to S126. If not (NO at S124), the process returns to S124. At S126, ECU 1000 stops discharge of first battery pack 510.

At S130, an engine ECU causes first battery pack 510 and second battery pack 520 to be charged with the electric power supplied from charger 600.

The operation of ECU 1000 based on the above-described structure and flowchart will be described.

As a result of repeated discharge from the battery pack or charge into the battery pack during travel of the vehicle, an error between the state of charge calculated by ECU 1000 and the actual state of charge may increase. In order to eliminate the error, when external power supply 608 for the hybrid vehicle is connected to charger 600 (YES at S100), the state of charge is automatically reset. That is, when charging first battery pack 510 and second battery pack 520 by charger 600, their states of charge are automatically reset.

In order to reset the states of charge, initially, second battery pack 520 is discharged (S110). Meanwhile, the electric power discharged from second battery pack 520 and the electric power supplied from charger 600 are charged into first battery pack 510 (S112). When the state of charge of second battery pack 520 is reduced to the reset value (YES at S114), discharge of second battery pack 520 is stopped (S116).

After second battery pack 520, first battery pack 510 is discharged (S120). The electric power discharged from first battery pack 510 and the electric power supplied from charger 600 are charged into second battery pack 520 (S122). When the state of charge of first battery pack 510 is reduced to the reset value (YES at S124), discharge of first battery pack 510 is stopped (S126).

Then, the electric power supplied from charger 600 is charged into first battery pack 510 and second battery pack 520 (S130).

As described above, according to the charging device for the electric system of the present embodiment, when charging the battery pack, the battery pack is automatically discharged until its state of charge is reduced to the reset value. After the state of charge is reduced to the reset value, the battery pack is charged. Consequently, the battery pack can be charged after the state of charge of the battery pack is automatically reset, thereby improving accuracy of the state of charge.

Second Embodiment

A second embodiment of the present invention will be described below. The present embodiment is different from the above-described first embodiment in that the battery pack is discharged such that a rate of reduction in its state of charge varies. The other structures are identical to those in the above-described first embodiment, and thus detailed description thereof will not be repeated.

Figure 6:
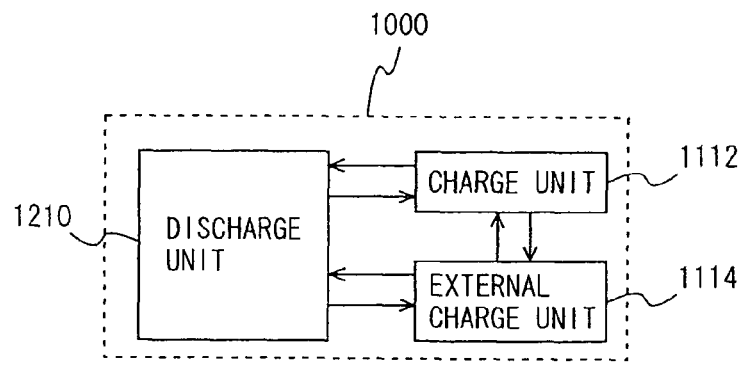
FIG. 6 is a functional block diagram of an ECU in a charging device according to a second embodiment of the present invention.

Referring to FIG. 6, a function of ECU 1000 will be described. It is noted that the function of ECU 1000 which will be described below may be implemented with software, or may be implemented with hardware.

Figure 7:
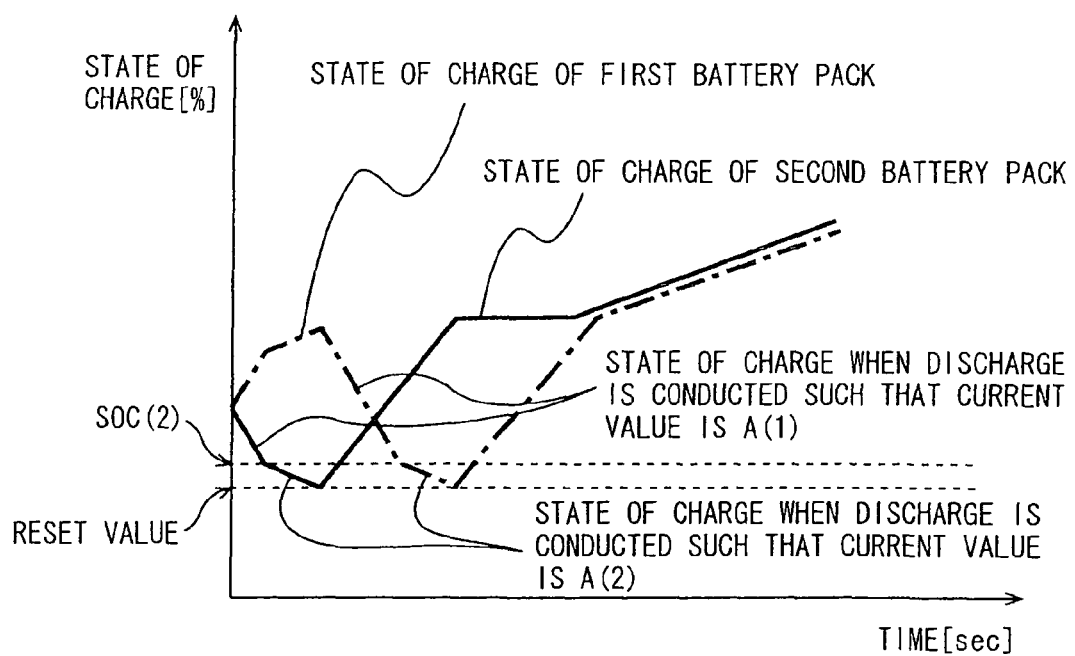
FIG. 7 is a diagram (No. 2) showing a state of charge of the first battery pack and a state of charge of the second battery pack.

As shown in FIG. 7, when the state of charge of the battery pack being discharged is higher than a threshold value SOC(2), namely, when the battery pack has a voltage higher than a threshold value V(2), a discharge unit 1210 in the present embodiment causes the battery pack to discharge such that a current value is A(1). When the state of charge of the battery pack being discharged is not higher than threshold value SOC(2), namely, when the battery pack has a voltage not higher than threshold value V(2), the battery pack is discharged such that the current value is A(2) which is lower than A(1). A rate of reduction in the state of charge is varied by changing the current value during discharge. The other functions are identical to those in the above-described first embodiment, and thus detailed description thereof will not be repeated here.

Figure 8:
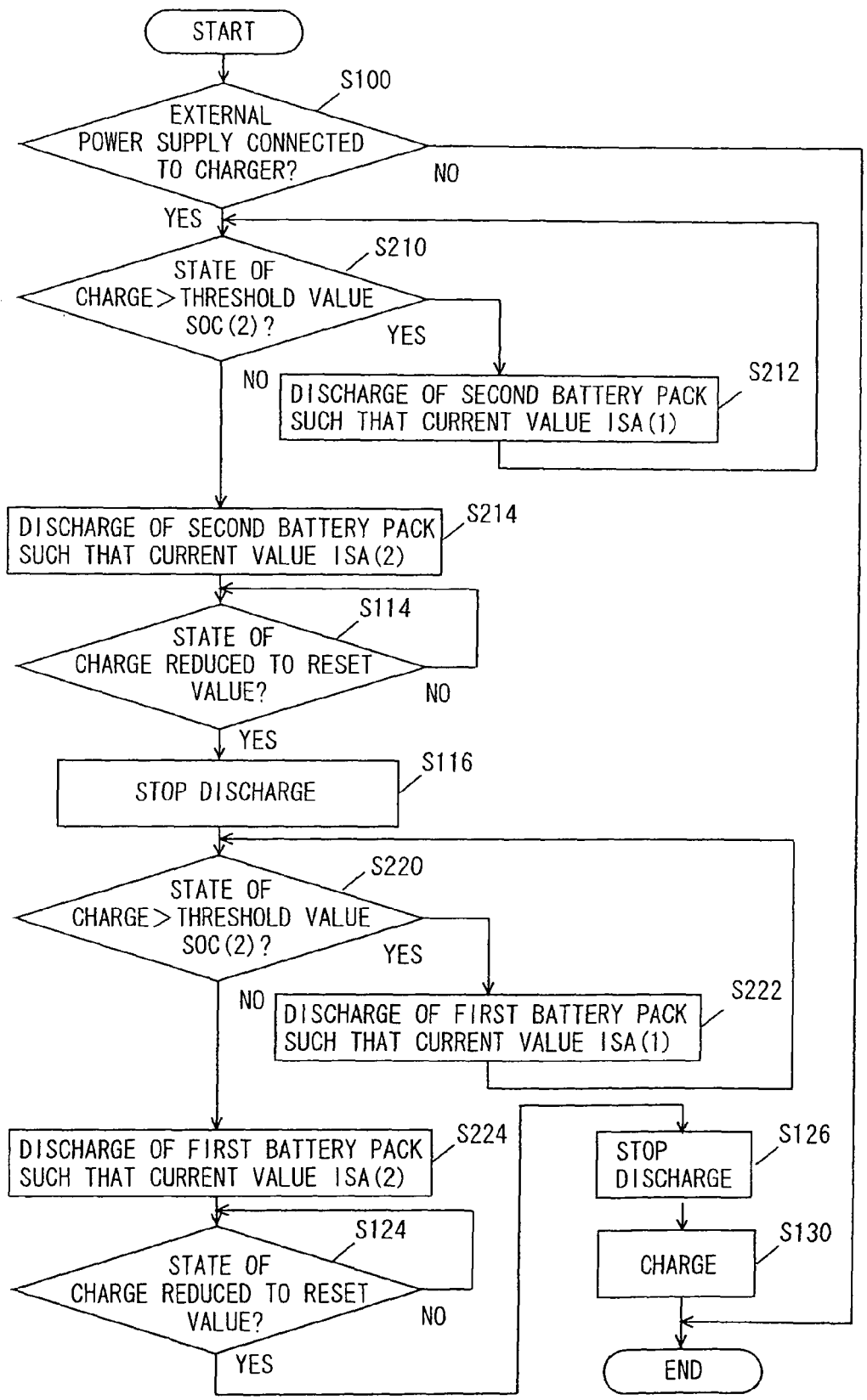
FIG. 8 is a flowchart showing a control structure of a program executed by the ECU in the charging device according to the second embodiment of the present invention.

Referring to FIG. 8, a control structure of a program executed by ECU 1000 will be described. It is noted that the same process steps as those in the above-described first embodiment are designated with the same step numbers, and thus detailed description thereof will not be repeated here.

At S210, ECU 1000 determines whether or not the state of charge of second battery pack 520 is higher than threshold value SOC(2). That is, it is determined whether or not second battery pack 520 has a voltage higher than threshold value V(2). If the state of charge of second battery pack 520 is higher than threshold value SOC(2) (YES at S210), the process proceeds to S212. If not (NO at S210), the process proceeds to S214.

At S212, ECU 1000 causes second battery pack 520 to discharge such that a current value is A(1). At S214, ECU 1000 causes second battery pack 510 to discharge such that the current value is A(2) which is lower than A(1).

At S220, ECU 1000 determines whether or not the state of charge of first battery pack 510 is higher than threshold value SOC(2). That is, it is determined whether or not first battery pack 510 has a voltage higher than threshold value V(2). If the state of charge of first battery pack 510 is higher than threshold value SOC(2) (YES at S220), the process proceeds to S222. If not (NO at S220), the process proceeds to S224.

At S222, ECU 1000 causes first battery pack 510 to discharge such that a current value is A(1). At S224, ECU 1000 causes first battery pack 510 to discharge such that the current value is A(2) which is lower than A(1).

As in the above-described first embodiment, the electric power discharged from second battery pack 520 is charged into first battery pack 510. The electric power discharged from first battery pack 510 is charged into second battery pack 520.

The operation of ECU 1000 in the charging device according to the present embodiment based on the above-described structure and flowchart will be described.

When external power supply 608 for the hybrid vehicle is connected to charger 600 (YES at S100), it is determined whether or not the state of charge of second battery pack 520 is higher than threshold value SOC(2) (S210).

If the state of charge of second battery pack 520 is higher than threshold value SOC(2) (YES at S210), second battery pack 520 is discharged such that the current value is A(1) (S212). If the state of charge of second battery pack 520 is not higher than threshold value SOC(2) (NO at S210), second battery pack 510 is discharged such that the current value is A(2) which is lower than A(1) (S214).

When the state of charge of second battery pack 520 is reduced to the reset value (YES at S114), discharge of second battery pack 520 is stopped (S116). When discharge of second battery pack 520 is stopped, it is determined whether or not the state of charge of first battery pack 510 is higher than threshold value SOC(2) (S220).

If the state of charge of first battery pack 510 is higher than threshold value SOC(2) (YES at S220), first battery pack 510 is discharged such that the current value is A(1) (S222).

If the state of charge of first battery pack 510 is not higher than threshold value SOC(2) (NO at S220), first battery pack 510 is discharged such that the current value is A(2) which is lower than A(1) (S224). When the state of charge of first battery pack 510 is reduced to the reset value (YES at S124), discharge of first battery pack 510 is stopped (S126). Then, the electric power supplied from charger 600 is charged into first battery pack 510 and second battery pack 520 (S130).

As described above, according to the charging device for the electric system of the present embodiment, the battery pack is discharged such that the rate of reduction in its state of charge varies. Therefore, the state of charge can be quickly reduced immediately after discharge is started, and the state of charge can be gradually reduced when the state of charge is in the vicinity of the reset value. As a result, discharge can be quickly conducted, and accuracy of the state of charge can be improved.

Third Embodiment

A third embodiment of the present invention will be described below. The present embodiment is different from the above-described first embodiment in that the battery pack is discharged such that a voltage value thereof is constant until its state of charge is reduced to the reset value. The other structures are identical to those in the above-described first embodiment, and thus detailed description thereof will not be repeated.

Figure 9:
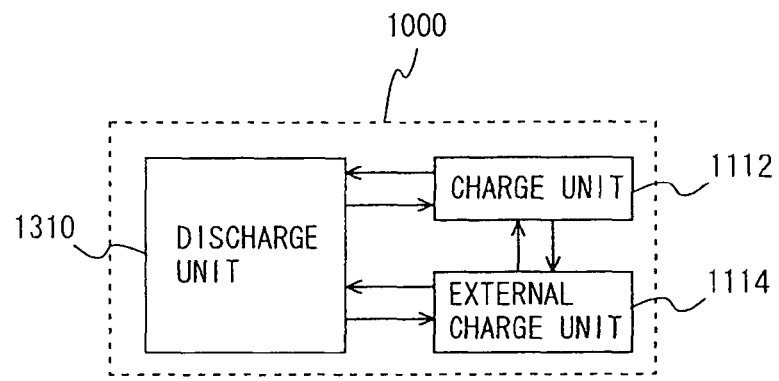
FIG. 9 is a functional block diagram of an ECU in a charging device according to a third embodiment of the present invention.

Referring to FIG. 9, a function of ECU 1000 will be described. It is noted that the function of ECU 1000 which will be described below may be implemented with software, or may be implemented with hardware.

Figure 10:
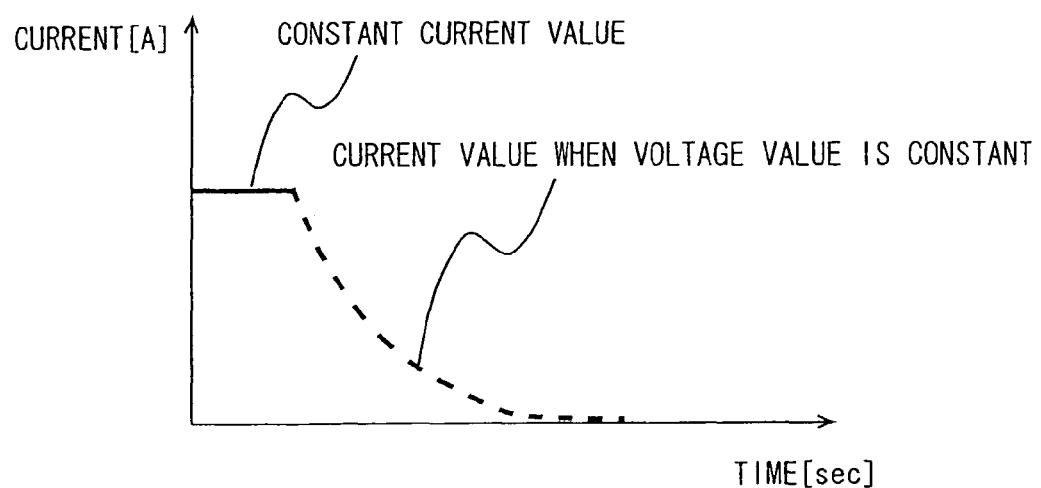
FIG. 10 shows a current value.

When the state of charge is higher than a threshold value SOC(3), namely, when the battery pack has a voltage higher than a threshold value V(3), a discharge unit 1310 in the present embodiment causes the battery pack to discharge such that a current value is constant, as shown in FIG. 10. When the state of charge is not higher than threshold value SOC, namely, when the voltage value of the battery pack is reduced to threshold value V(3), the battery pack is discharged such that a voltage value thereof is constant. That is, the voltage value of the battery pack is maintained at threshold value V(3).

Further, in the present embodiment, when a value of a current discharged from the battery pack is reduced to a threshold value which is determined correspondingly to the reset value during discharge of the battery pack such that a voltage value thereof is constant, it is determined that the state of charge has been reduced to the reset value. When the state of charge is reduced to the reset value, discharge is stopped. The other functions are identical to those in the above-described first embodiment, and thus detailed description thereof will not be repeated here.

Figure 11:
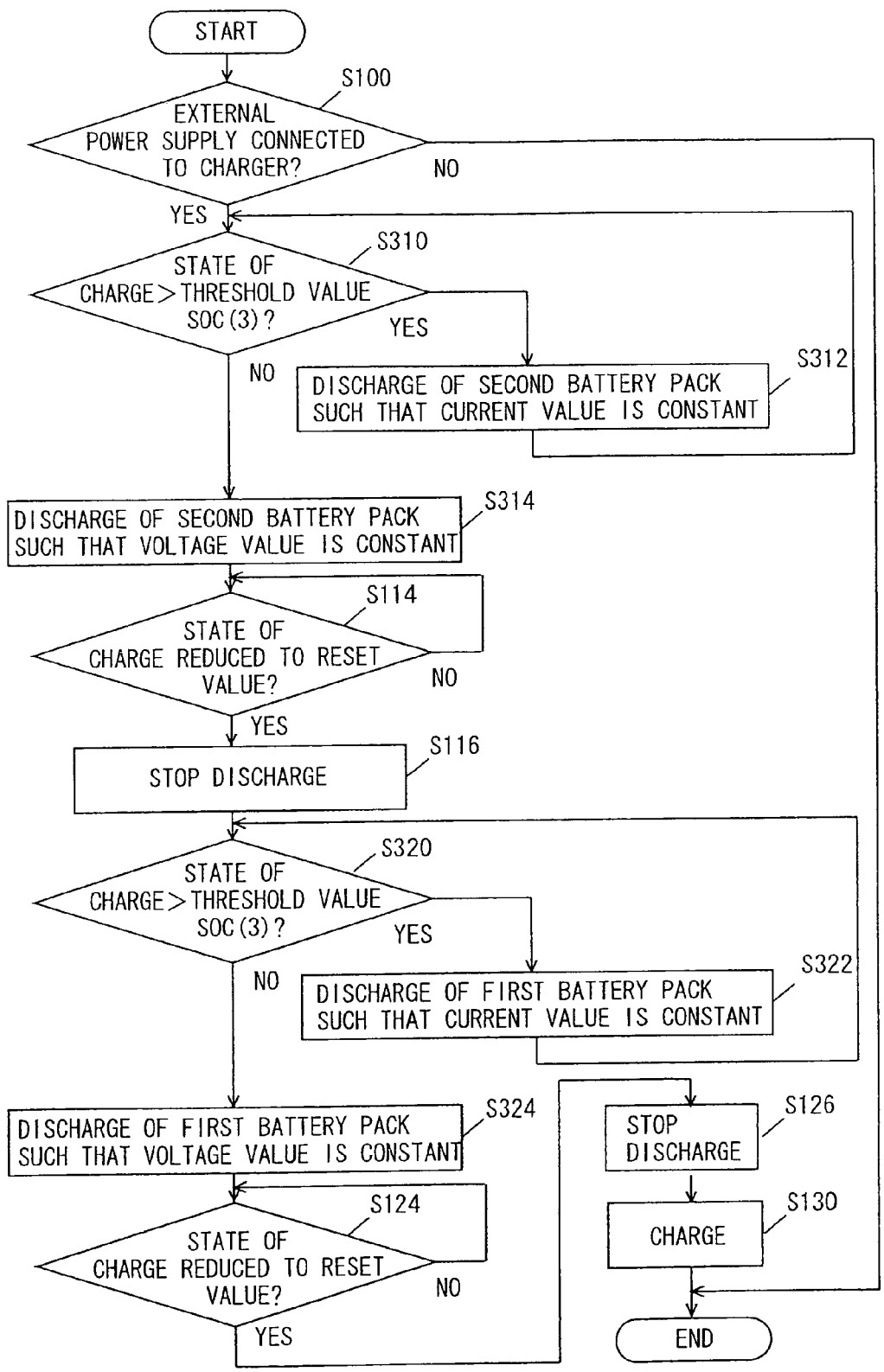
FIG. 11 is a flowchart showing a control structure of a program executed by the ECU in the charging device according to the third embodiment of the present invention.

Referring to FIG. 11, a control structure of a program executed by ECU 1000 will be described. It is noted that the same process steps as those in the above-described first embodiment are designated with the same step numbers, and thus detailed description thereof will not be repeated here.

At S310, ECU 1000 determines whether or not the state of charge of second battery pack 520 is higher than threshold value SOC(3). That is, it is determined whether or not second battery pack 520 has a voltage higher than threshold value V(3). If the state of charge of second battery pack 520 is higher than threshold value SOC(3) (YES at S310), the process proceeds to S312. If not (NO at S310), the process proceeds to S314.

At S312, ECU 1000 causes second battery pack 520 to discharge such that a current value is constant. At S314, ECU 1000 causes second battery pack 510 to discharge such that a voltage value thereof is constant.

At S320, ECU 1000 determines whether or not the state of charge of first battery pack 510 is higher than threshold value SOC(3). That is, it is determined whether or not first battery pack 510 has a voltage higher than threshold value V(3). If the state of charge of first battery pack 510 is higher than threshold value SOC(3) (YES at S320), the process proceeds to S322. If not (NO at S320), the process proceeds to S324.

At S322, ECU 1000 causes first battery pack 510 to discharge such that a current value is constant. At S324, ECU 1000 causes first battery pack 510 to discharge such that a voltage value thereof is constant.

The operation of ECU 1000 in the charging device according to the present embodiment based on the above-described structure and flowchart will be described.

When external power supply 608 for the hybrid vehicle is connected to charger 600 (YES at S100), it is determined whether or not the state of charge of second battery pack 520 is higher than threshold value SOC(3) (S310).

If the state of charge of second battery pack 520 is higher than threshold value SOC(3) (YES at S310), second battery pack 520 is discharged such that a current value is constant (S312).

If the state of charge of second battery pack 520 is not higher than threshold value SOC(3) (NO at S310), second battery pack 510 is discharged such that a voltage value thereof is constant (S314).

When the state of charge of second battery pack 520 is reduced to the reset value (YES at S114), discharge of second battery pack 520 is stopped (S116). When discharge of second battery pack 520 is stopped, it is determined whether or not the state of charge of first battery pack 510 is higher than threshold value SOC(3) (S320).

If the state of charge of first battery pack 510 is higher than threshold value SOC(3) (YES at S320), first battery pack 510 is discharged such that a current value is constant (S322).

If the state of charge of first battery pack 510 is not higher than threshold value SOC(3) (NO at S320), first battery pack 510 is discharged such that a voltage value thereof is constant (S324). When the state of charge of first battery pack 510 is reduced to the reset value (YES at S124), discharge of first battery pack 510 is stopped (S126). Then, the electric power supplied from charger 600 is charged into first battery pack 510 and second battery pack 520 (S130).

As described above, according to the charging device for the electric system of the present embodiment, the battery pack is discharged such that a voltage value thereof is constant. Therefore, the value of the current discharged from the battery pack can be varied depending more on the state of charge than on the voltage. As a result, by monitoring the value of the current discharged from the battery pack, the state of charge of the battery pack can be accurately reduced to the reset value.

Fourth Embodiment

A fourth embodiment of the present invention will be described below. The present embodiment is different from the above-described first embodiment in that whether to permit or prohibit discharge of the battery pack is determined in accordance with the state of charge of the battery pack. The present embodiment is also different from the above-described first embodiment in that, if discharge of the battery packs is prohibited, the battery packs are controlled such that one of the battery packs of the states of charge of two battery packs is preferentially discharged during travel of the vehicle. The other structures are identical to those in the above-described first embodiment, and thus detailed description thereof will not be repeated.

Figure 12:
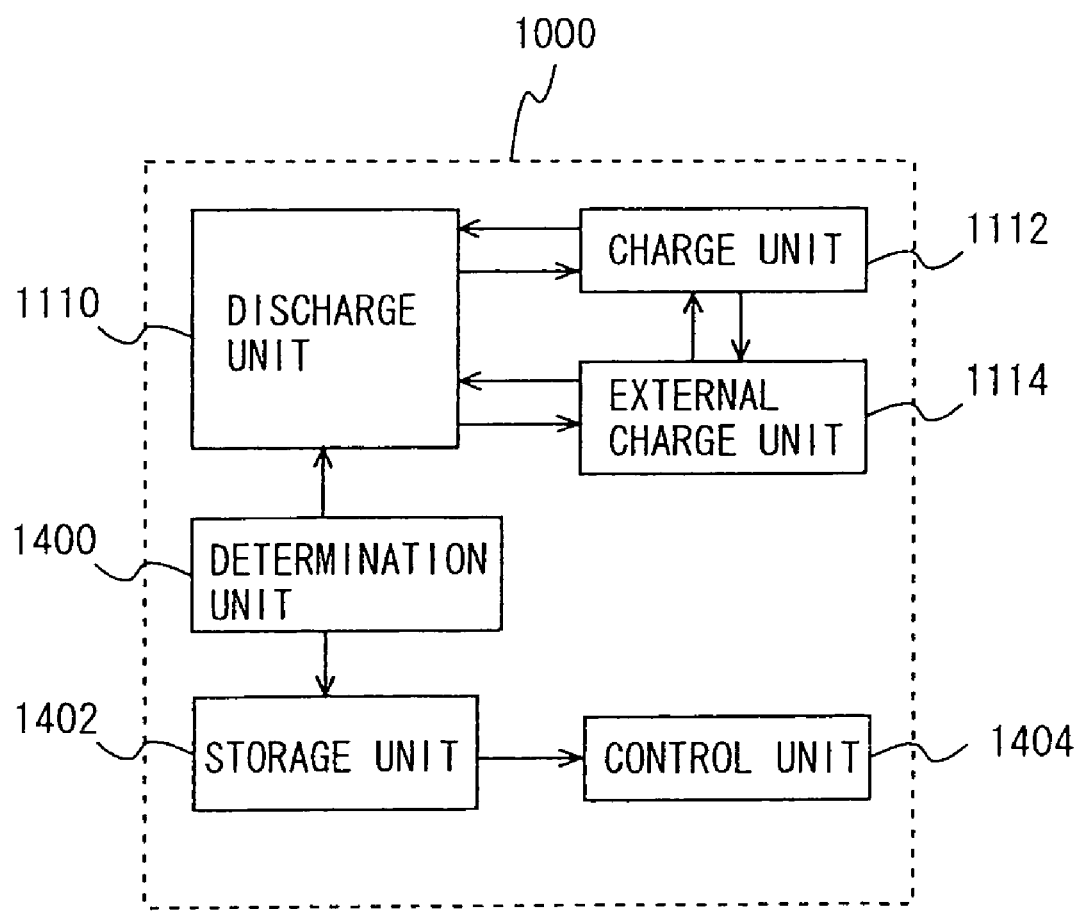
FIG. 12 is a functional block diagram of an ECU in a charging device according to a fourth embodiment of the present invention.

Referring to FIG. 12, a function of ECU 1000 will be described. It is noted that the function of ECU 1000 which will be described below may be implemented with software, or may be implemented with hardware.

ECU 1000 according to the present embodiment further includes a determination unit 1400, a storage unit 1402, and a control unit 1404. Determination unit 1400 determines whether to permit or prohibit discharge of a battery pack for resetting its state of charge in accordance with the state of charge of first battery pack 510 and the state of charge of second battery pack 520. That is, it is determined whether to permit or prohibit reset of the state of charge.

For example, when the state of charge of at least any one of first battery pack 510 and second battery pack 520 is lower than a threshold value SOC(4), discharge is permitted. On the other hand, the states of charge of both of the battery packs are equal to or higher than threshold value SOC(4), discharge is prohibited. Threshold value SOC(4) is set, for example, to a value half the maximum value of the state of charge of the battery pack, i.e., "50%".

A method of determining whether to permit or prohibit discharge is not limited as such. Alternatively, discharge may be permitted when the states of charge of both of the battery packs are lower than threshold value SOC(4). Discharge may be prohibited when the state of charge of at least any one of first battery pack 510 and second battery pack 520 is equal to or higher than threshold value SOC(4).

Still alternatively, discharge may be permitted when a sum of the state of charge of first battery pack 510 and the state of charge of second battery pack 520 is not higher than a threshold value. On the other hand, discharge may be prohibited when a sum of the state of charge of first battery pack 510 and the state of charge of second battery pack 520 is higher than the threshold value. The threshold value is set, for example, to the maximum value of the state of charge of first battery pack 510 or second battery pack 520, i.e., "100%". The threshold value is not limited as such.

If discharge for resetting the state of charge is prohibited, storage unit 1402 stores the fact that discharge was prohibited. If discharge is permitted, the fact that discharge was permitted may be stored.

If discharge for resetting the state of charge is prohibited, control unit 1404 controls the battery packs such that one of the two battery packs is preferentially discharged during travel of the vehicle. For example, the battery packs are controlled such that only first battery pack 510 supplies electric power to MG 200 until the state of charge of first battery pack 510 is equal to or lower than half the maximum value. A method of controlling the battery packs is not limited as such.

Figure 13:
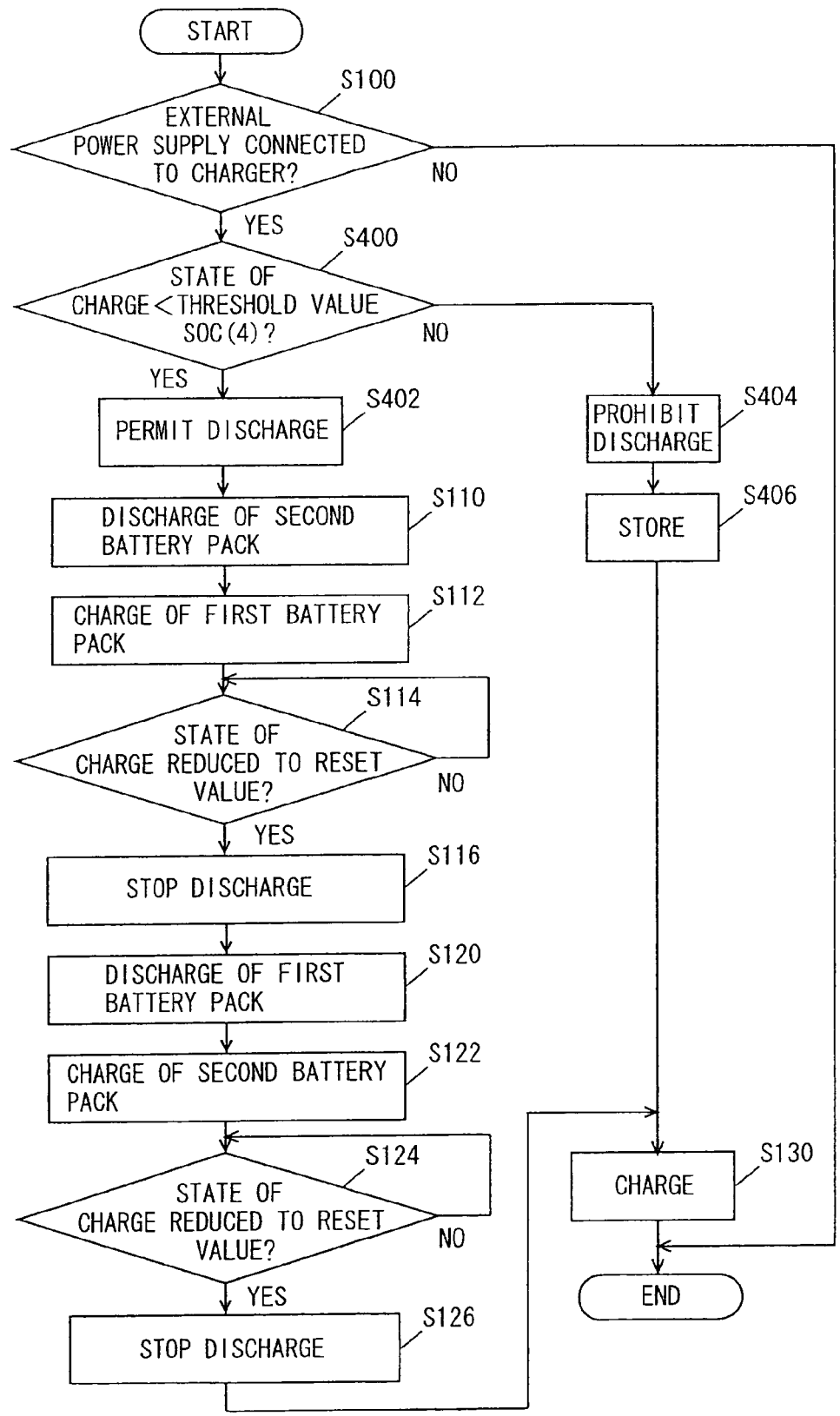
FIG. 13 is a flowchart (No. 1) showing a control structure of a program executed by the ECU in the charging device according to the fourth embodiment of the present invention.

Referring to FIG. 13, a control structure of a program executed by ECU 1000 when charging the battery packs will be described. It is noted that the same process steps as those in the above-described first embodiment are designated with the same step numbers, and thus detailed description thereof will not be repeated here.

At S400, ECU 1000 determines whether or not the state of charge of at least any one of first battery pack 510 and second battery pack 520 is lower than threshold value SOC(4). If the state of charge of at least any one of first battery pack 510 and second battery pack 520 is lower than threshold value SOC(4) (YES at S400), the process proceeds to S402. If not (NO at S400), the process proceeds to S404.

At S402, ECU 1000 permits discharge of the battery pack for resetting its state of charge. At S404, ECU 1000 prohibits discharge of the battery packs for resetting their states of charge. At S406, ECU 1000 has prohibition of discharge stored.

Figure 14:
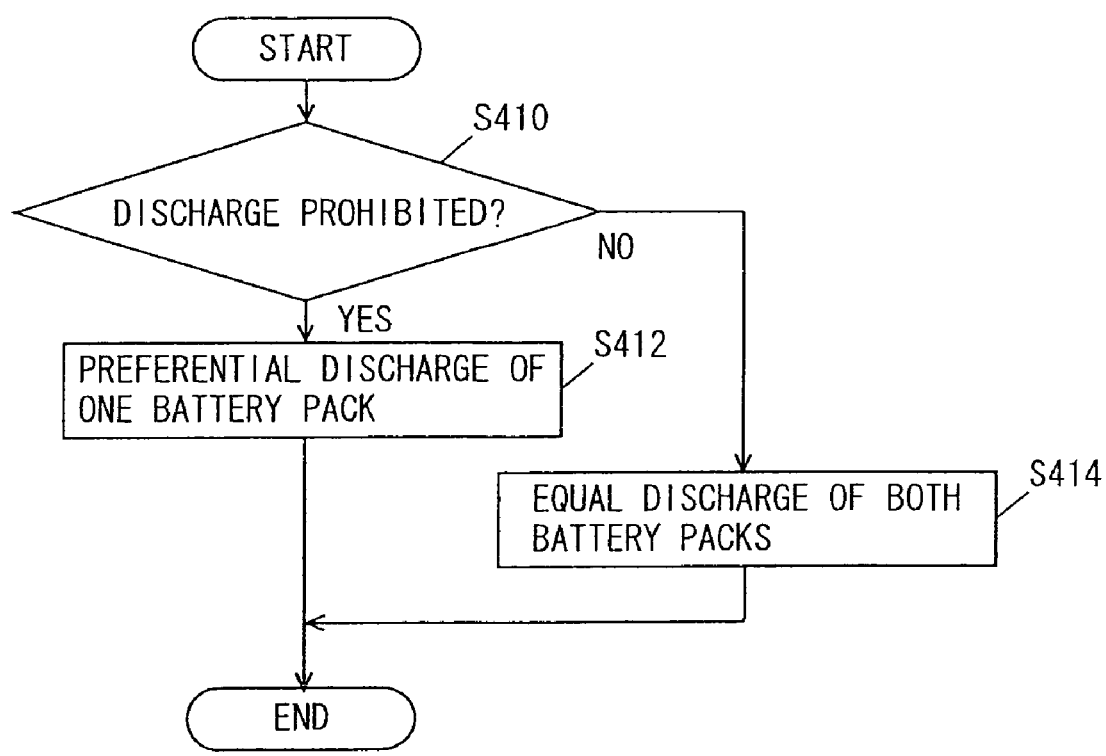
FIG. 14 is a flowchart (No. 2) showing a control structure of a program executed by the ECU in the charging device according to the fourth embodiment of the present invention.

Referring to FIG. 14, a control structure of a program executed by ECU 1000 during travel of the hybrid vehicle will be described.

At S410, ECU 1000 determines whether or not discharge of the battery pack was prohibited during charge. If discharge was prohibited (YES at S410), the process proceeds to S412. If not (NO at S410), the process proceeds to S414.

At S412, ECU 1000 controls the battery packs such that one of the two battery packs is preferentially discharged. At S414, ECU 1000 controls the battery packs such that the two battery packs are equally discharged.

The operation of ECU 1000 in the charging device according to the present embodiment based on the above-described structure and flowchart will be described.

When external power supply 608 for the hybrid vehicle is connected to charger 600 (YES at S100), it is determined whether or not the state of charge of at least any one of first battery pack 510 and second battery pack 520 is lower than threshold value SOC(4) (S400).

If the state of charge of at least any one of first battery pack 510 and second battery pack 520 is lower than threshold value SOC(4) (YES at S400), discharge of the battery pack for resetting its state of charge is permitted (S402).

If the states of charge of both of the battery packs are equal to or higher than threshold value SOC(4) (NO at S400), discharge of the battery packs for resetting their states of charge is prohibited (S404). The fact that discharge was prohibited is stored (S406).

Consequently, when resetting a state of charge, at least part of electric power discharged from one of the battery packs can be charged into the other battery pack, thereby resetting the state of charge without wasting the electric power. As a result, loss of the electric power discharged from the battery pack in order to reset the state of charge can be decreased.

If discharge is prohibited (YES at S410), the battery packs are controlled such that one of the two battery packs is preferentially discharged, so that discharge for resetting the state of charge is permitted during the next charge (S412). Accordingly, a condition for resetting the state of charge during the next charge can be easily satisfied.

If discharge is permitted (NO at S410), on the other hand, the battery packs are controlled such that the two battery packs are equally discharged (S414).

As described above, according to the charging device for the electric system of the present embodiment, discharge is permitted if the state of charge of at least any one of the first battery pack and the second battery pack is lower than threshold value SOC(4). Discharge is prohibited if the states of charge of both of the battery packs are equal to or higher than threshold value SOC(4). Consequently, when resetting a state of charge, at least part of electric power discharged from one of the battery packs can be charged into the other battery pack, thereby resetting the state of charge without wasting the electric power. As a result, loss of the electric power discharged from the battery pack in order to reset the state of charge can be decreased. Moreover, if discharge is prohibited, the battery packs are controlled such that one of the two battery packs is preferentially discharged during travel of the vehicle. Accordingly, the condition for resetting the state of charge during the next charge can be easily satisfied.

Fifth Embodiment

A fifth embodiment of the present invention will be described below. The present embodiment is different from the above-described first embodiment in that, if discharge of a battery pack is suspended before its state of charge is reduced to a reset value, regenerative charge (charge during regenerative braking) to the battery pack during travel is prohibited, and discharge of the battery pack is resumed during the next charge. The other structures are identical to those in the above-described first embodiment, and thus detailed description thereof will not be repeated.

Referring to FIG. 15, a function of ECU 1000 will be described. It is noted that the function of ECU 1000 which will be described below may be implemented with software, or may be implemented with hardware.

ECU 1000 according to the present embodiment further includes a storage unit 1500 and a prohibition unit 1502.

If discharge of a battery pack is suspended before its state of charge is reduced to a reset value, storage unit 1500 stores the fact that discharge was suspended (the fact that reset of the state of charge was suspended), and information on the battery pack that was being discharged, the state of charge or a voltage of that battery pack and the like. The information to be stored is not limited as such.

For example, when external power supply 608 for the hybrid vehicle is removed from charger 600 during reset of a state of charge, discharge of the battery pack, i.e., reset of the state of charge, is suspended.

If discharge of a battery pack is suspended before its state of charge is reduced to a reset value, prohibition unit 1502 prohibits regenerative charge to the battery pack that was being discharged.

If discharge for resetting the state of charge is suspended, a discharge unit 1510 in the present embodiment resumes discharge of the battery pack that was being discharged when charging the battery pack next time. That is, the previous discharge is continued with the state of charge or the voltage at the time when discharge was suspended.

Figure 16:
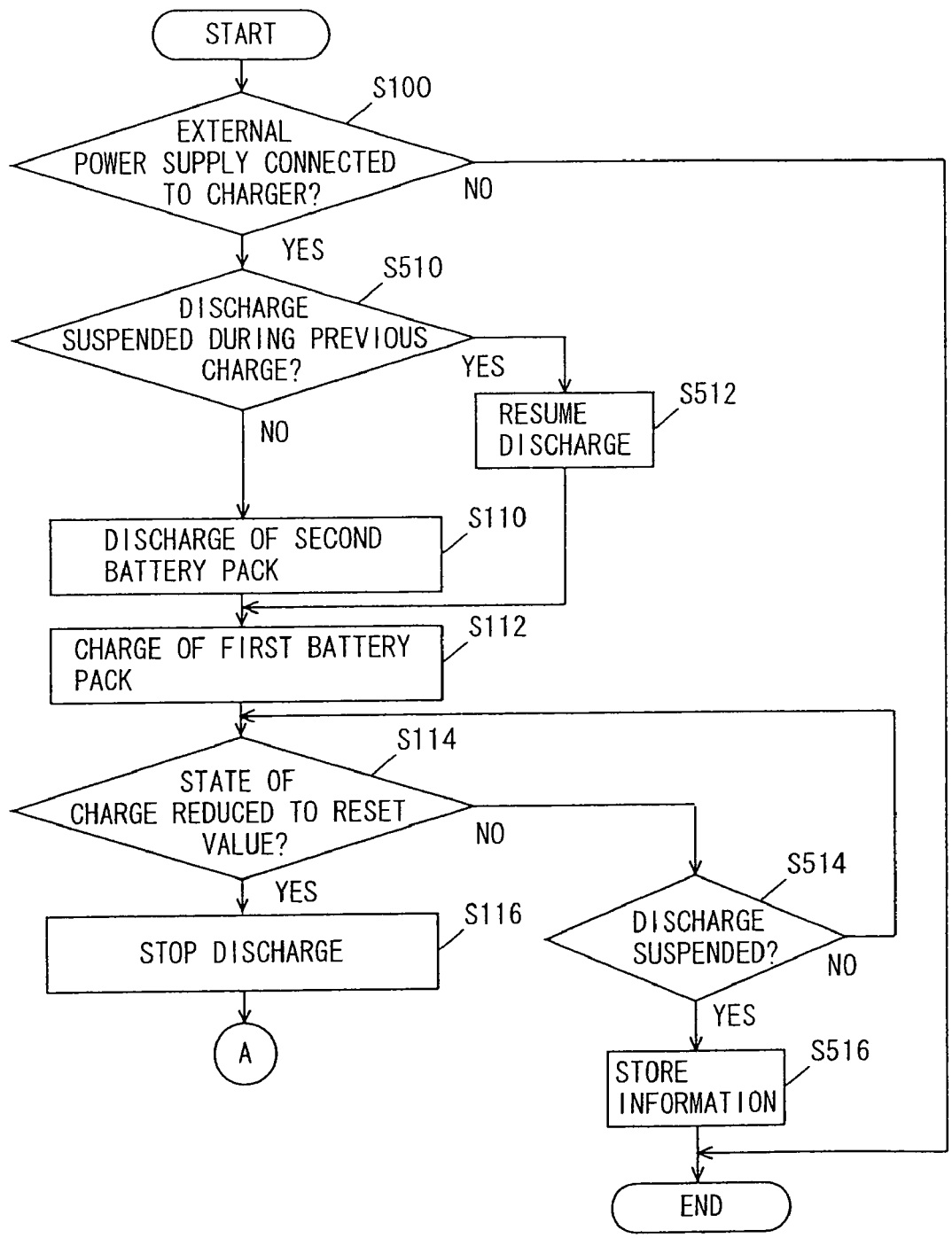
FIG. 16 is a flowchart (No. 1) showing a control structure of a program executed by the ECU in the charging device according to the fifth embodiment of the present invention.
Figure 17:
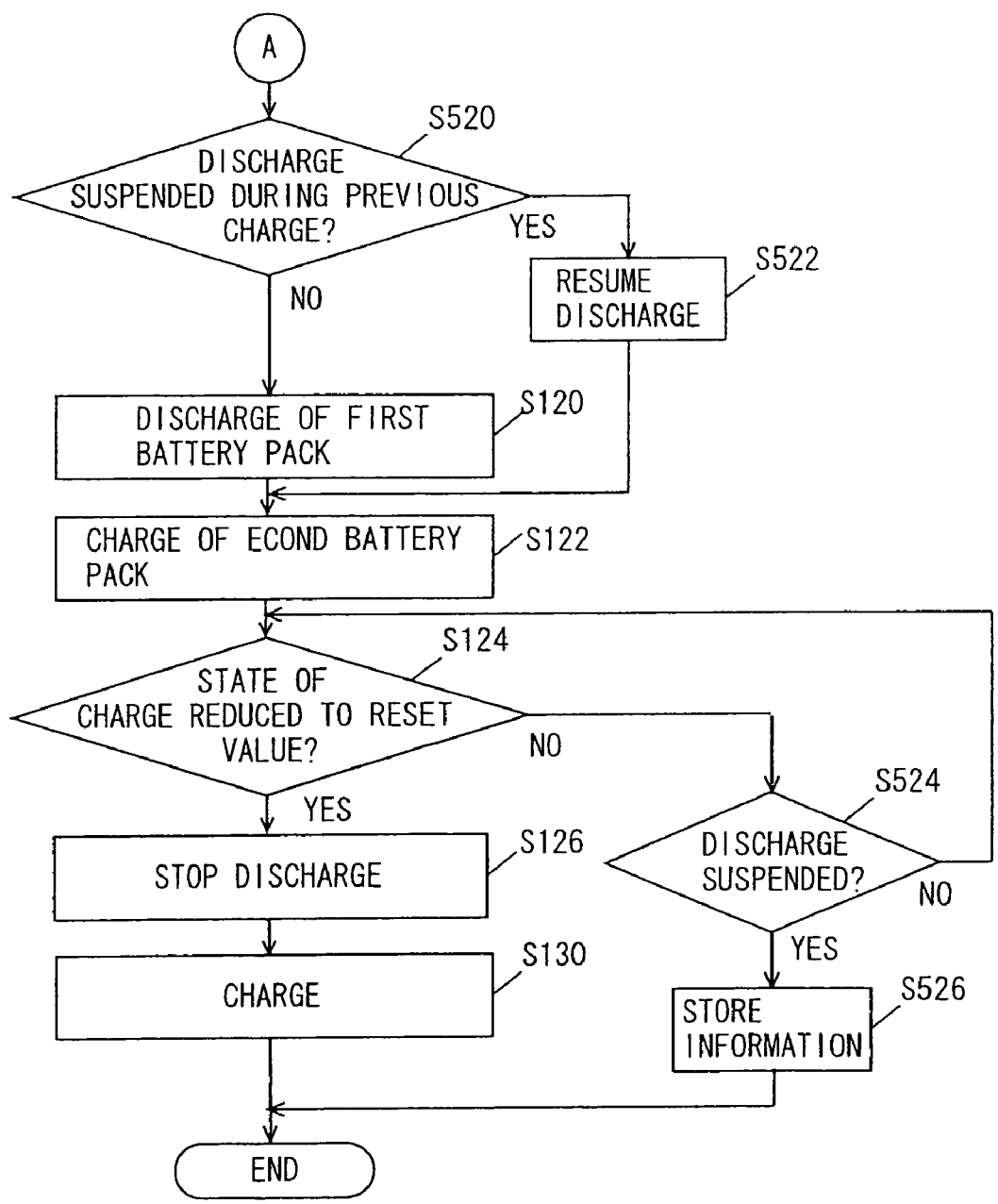
FIG. 17 is a flowchart (No. 2) showing a control structure of a program executed by the ECU in the charging device according to the fifth embodiment of the present invention.

Referring to FIGS. 16 and 17, a control structure of a program executed by ECU 1000 when charging the battery packs will be described. It is noted that the same process steps as those in the above-described first embodiment are designated with the same step numbers, and thus detailed description thereof will not be repeated here.

At S510, ECU 1000 determines whether or not discharge of second battery pack 520 was suspended during the previous charge. If discharge was suspended (YES at S510), the process proceeds to S512. If not (NO at S510), the process proceeds to S110.

At S512, ECU 1000 resumes discharge of second battery pack 520. That is, the previous discharge is continued with the state of charge or the voltage at the time when discharge was suspended.

At S514, ECU 1000 determines whether or not discharge of second battery pack 520 was suspended. If discharge was suspended (YES at S514), the process proceeds to S516. If not (NO at S514), the process returns to S114.

At S516, ECU 1000 stores the fact that discharge of second battery pack 520 was suspended, and information on the state of charge or the voltage of second battery pack 520 at the time of suspension and the like. Then, this process ends.

At S520, ECU 1000 determines whether or not discharge of first battery pack 510 was suspended during the previous charge. If discharge was suspended (YES at S520), the process proceeds to S522. If not (NO at S520), the process proceeds to S120.

At S522, ECU 1000 resumes discharge of first battery pack 510. That is, the previous discharge is continued with the state of charge or the voltage at the time when discharge was suspended.

At S524, ECU 1000 determines whether or not discharge of first battery pack 510 was suspended. If discharge was suspended (YES at S524), the process proceeds to 5526. If not (NO at S524), the process returns to S124.

At S526, ECU 1000 stores the fact that discharge of first battery pack 510 was suspended, and information on the state of charge or the voltage of first battery pack 510 at the time of suspension and the like. Then, this process ends.

Referring to FIG. 18, a control structure of a program executed by ECU 1000 during travel of the hybrid vehicle will be described.

At S530, ECU 1000 determines whether or not discharge of a battery pack was suspended during the previous charge. If discharge was suspended (YES at S530), the process proceeds to S532. If not (NO at S530), this process ends. At S532, ECU 1000 prohibits regenerative charge to the battery pack of which discharge was suspended.

The operation of ECU 1000 in the charging device according to the present embodiment based on the above-described structure and flowchart will be described.

If discharge of second battery pack 520 for resetting its state of charge is suspended (YES at S514), the fact that discharge of second battery pack 520 was suspended, and information on the state of charge or the voltage of second battery pack 520 at the time of suspension and the like are stored (S516).

Likewise, if discharge of first battery pack 510 for resetting its state of charge is suspended (YES at S524), the fact that discharge of first battery pack 510 was suspended, and information on the state of charge or the voltage of first battery pack 510 at the time of suspension and the like are stored (S526).

If discharge of a battery pack was suspended during the previous charge (YES at S530), regenerative charge to the battery pack of which discharge was suspended is prohibited during travel of the hybrid vehicle (S532).

Thereafter, when external power supply 608 for the hybrid vehicle is connected to charger 600 for recharging first battery pack 510 and second battery pack 520 (YES at S100), it is determined whether or not discharge of second battery pack 520 was suspended during the previous charge (S510).

If discharge of second battery pack 520 was suspended (YES at S510), discharge of second battery pack 520 is resumed (S512). If discharge of first battery pack 510 was suspended (YES at S520), on the other hand, discharge of first battery pack 510 is resumed (S522).

As described above, according to the charging device for the electric system of the present embodiment, if discharge for resetting a state of charge is suspended, discharge is resumed with the state of charge or the voltage at the time when discharge was suspended when charging the battery pack next time. Therefore, discharge, namely, reset of the state of charge, can be quickly completed.

Other Embodiments

The above-described first to fifth embodiments may be combined in any manner.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A charging method for an electric system including a power storage mechanism for storing electric power, comprising the steps of:
    detecting connection of said power storage mechanism to an external power supply;
    automatically causing said power storage mechanism to discharge until a state of charge of said power storage mechanism decreases to a predetermined value if connection of said power storage mechanism to said external power supply is detected;
    charging said power storage mechanism after discharge of said power storage mechanism until the state of charge of said power storage mechanism decreases to said predetermined value, wherein
    said power storage mechanism includes a first power storage mechanism and a second power storage mechanism connected in parallel to each other,
    said step of causing said power storage mechanism to discharge includes the step of causing said first power storage mechanism and said second power storage mechanism to discharge in an alternating manner, and said charging method further comprises the steps of
    charging electric power discharged from said first power storage mechanism into said second power storage mechanism,
    charging, during discharge of said first power storage mechanism, electric power supplied from outside said electric system into said second power storage mechanism,
    charging electric power discharged from said second power storage mechanism into said first power storage mechanism, and
    charging, during discharge of said second power storage mechanism, electric power supplied from outside said electric system into said first power storage mechanism.

2. The charging method for an electric system according to claim 1, wherein
    said step of causing said power storage mechanism to discharge includes the step of causing said power storage mechanism to discharge such that a rate of reduction in the state of charge of said power storage mechanism varies depending on at least any one of the state of charge and a voltage of said power storage mechanism during discharge of said power storage mechanism.

3. The charging method for an electric system according to claim 1, further comprising the step of determining whether to permit or prohibit discharge of said power storage mechanism in accordance with the state of charge of said power storage mechanism.

4. The charging method for an electric system according to claim 1, wherein
    said power storage mechanism is mounted on a vehicle for supplying electric power to a driving source, and
    said charging method further comprises the steps of storing information about discharge of said power storage mechanism until the state of charge of said power storage mechanism decreases to said predetermined value, and controlling said power storage mechanism during travel of said vehicle based on said information.

5. The charging method for an electric system according to claim 1, further comprising the step of storing information about discharge of said power storage mechanism until the state of charge of said power storage mechanism decreases to said predetermined value during a first period, wherein
    said step of causing said power storage mechanism to discharge includes the step of causing said power storage mechanism to discharge based on said information when charging said power storage mechanism during a second period later than said first period.

6. The charging method for an electric system according to claim 1, wherein
    said power storage mechanism is a battery.

7. A charging device for an electric system including a power storage mechanism for storing electric power, comprising:
    means for detecting connection of said power storage mechanism to an external power supply;

discharge means for automatically causing said power storage mechanism to discharge until a state of charge of said power storage mechanism decreases to a predetermined value if connection of said power storage mechanism to said external power supply is detected;

means for charging said power storage mechanism after discharge of said power storage mechanism until the state of charge of said power storage mechanism decreases to said predetermined value, wherein said power storage mechanism includes a first power storage mechanism and a second power storage mechanism connected in parallel to each other, said discharge means includes means for causing said first power storage mechanism and said second power storage mechanism to discharge in an alternating manner, and said charging device further comprises means for charging electric power discharged from said first power storage mechanism into said second power storage mechanism, means for charging, during discharge of said first power storage mechanism, electric power supplied from outside said electric system into said second power storage mechanism, means for charging electric power discharged from said second power storage mechanism into said first power storage mechanism, and means for charging, during discharge of said second power storage mechanism, electric power supplied from outside said electric system into said first power storage mechanism.

8. The charging device for an electric system according to claim 7, wherein said discharge means includes means for causing said power storage mechanism to discharge such that a rate of reduction in the state of charge of said power storage mechanism varies depending on at least any one of the state of charge and a voltage of said power storage mechanism during discharge of said power storage mechanism.

9. The charging device for an electric system according to claim 7, wherein said discharge means includes means for causing said power storage mechanism to discharge such that a voltage thereof is constant.

10. The charging device for an electric system according to claim 7, further comprising means for determining whether to permit or prohibit discharge of said power storage mechanism in accordance with the state of charge of said power storage mechanism.

11. The charging device for an electric system according to claim 7, wherein said power storage mechanism is mounted on a vehicle for supplying electric power to a driving source, and said charging device further comprises means for storing information about discharge of said power storage mechanism until the state of charge of said power storage mechanism decreases to said predetermined value, and means for controlling said power storage mechanism during travel of said vehicle based on said information.

12. The charging device for an electric system according to claim 7, further comprising means for storing information about discharge of said power storage mechanism until the state of charge of said power storage mechanism decreases to said predetermined value during a first period, wherein said discharge means includes means for causing said power storage mechanism to discharge based on said information when charging said power storage mechanism during a second period later than said first period.

13. The charging device for an electric system according to claim 7, wherein said power storage mechanism is a battery.

* * * * *